United State
Dillon, Jr. et al.

[11] 3,870,397
[45] Mar. 11, 1975

[54] THIN FILM MAGNETO-OPTIC SWITCH

[75] Inventors: Joseph Francis Dillon, Jr.; Ernst Michael Gyorgy Madison; Legrand Gerard Van Uitert, all of Morris Township, Morris County, N.J.

[73] Assignee: Bell Telephone Laboratories, Incorporated, Murray Hill, N.J.

[22] Filed: Nov. 13, 1973

[21] Appl. No.: 415,369

[52] U.S. Cl. ......... 350/96 WG, 350/151, 350/160 R
[51] Int. Cl. ............................................. G02b 5/14
[58] Field of Search ......... 350/96 WG, 96 C, 96 R, 350/151, 160

[56] References Cited
UNITED STATES PATENTS

| | | |
|---|---|---|
| 3,512,867 | 5/1970 | Pearson .................. 350/160 R X |
| 3,639,855 | 2/1972 | Dillon, Jr. et al. .................. 350/151 |
| 3,666,351 | 5/1972 | Pao .................. 350/151 |
| 3,756,690 | 9/1973 | Borrelli et al. .................. 350/96 WG |
| 3,764,195 | 10/1973 | Blank et al. .................. 350/96 WG |
| 3,781,081 | 12/1973 | Rokos .................. 350/96 WG |
| 3,781,086 | 12/1973 | Kumada .................. 350/151 |

*Primary Examiner*—Alfred E. Smith
*Assistant Examiner*—Saxfield Chatmon, Jr.
*Attorney, Agent, or Firm*—G. S. Indig

[57] ABSTRACT

A device is described for switching the direction of visible and near-visible electromagnetic radiation traveling in the plane of a thin film of magnetic material. The invention is based on the interaction of electromagnetic radiation with patterned regions (such as a diffraction grating or a waveguiding strip) whose coercivity is different from that of the area surrounding the regions.

17 Claims, 2 Drawing Figures

PATENTED MAR 11 1975    3,870,397

THIN FILM MAGNETO-OPTIC SWITCH

BACKGROUND OF THE INVENTION

1. Field of the Invention

The invention is concerned with light (i.e., visible and near-visible electromagnetic radiation) propagating in a thin film of magnetic material.

2. Description of the Prior Art

Since the invention of lasers as sources of coherent electromagnetic radiation, interest has greatly increased in the use of light as information carrier. Of particular interest are integrated systems based on thin-film technology and consisting of miniature components such as light sources, modulators, transmitters and switching elements.

For the purpose of deflecting light in thin films a variety of physical effects can be exploited. For example, the acousto-optical device described by L. Kuhn et al., "Deflection of an Optical Guided Wave by a Surface Acoustic Wave," *Applied Physics Letters*, Vol. 17, No. 6, Sept. 15, 1970, pp. 265–267, deflects light traveling in the plane of a glass film by means of an acoustical wave.

Another example is the electro-optic device described in J. M. Hammer, "Digital Electro-Optic Grating Deflector and Modulator," *Applied Physics Letters*, Vol. 18, No. 4, Feb. 15, 1971, pp. 147–149, which deflects light traveling in a thin slab of lithium niobate. In this case it is a voltage applied to suitably shaped electrodes attached to the slab which controls the direction of light propagation.

A device which may be viewed as a predecessor to the present invention is the magnetically controlled beam deflector, as described in U.S. Pat. No. 3,515,457 issued to J. F. Dillon, Jr., on June 2, 1970. Here, light is deflected by means of a grating formed by a stack of magnetic plates, the magnetization of each plate being opposite to that of its neighbors. This device, however, is too bulky to be incorporated in thin film systems.

A line of development which is of primary importance to the invention described below is that of materials for magnetic bubble devices. Such devices use thin films of magnetic materials in which domains magnetized opposite to the surrounding area can be nucleated and propagated. In prominent use for this purpose are materials patterned after the garnet $Y_3Fe_5O_{12}$ (YIG), a portion of the iron ions having been replaced by nonmagnetic ions such as gallium or aluminum. Films of adequate quality can be grown by a process known as liquid phase epitaxy (LPE) and subsequently modified locally to generate regions in which the coercive force differs from that in the surrounding area. Prominent among such modification techniques is the annealing method, as described in R. C. LeCraw et al., "Localized Control of Magnetization in LPE Bubble Garnet Films" to appear in *IEEE Trans. Mag.* 1973; but other methods, for instance ion implantation, can be used. These techniques serve to locally modify the magnetic moment by changing the distribution of nonmagnetic ions over the octahedral and tetrahedral sites in a garnet. Specifically, if the garnet contains $x$ nonmagnetic ions M per formula unit and if a fraction $f$ of these ions is on octahedral sites, then a formula unit can be written as $$Y_3[Fe_{2-fx}M_{fx}](Fe_{3-(1-f)x}M_{(1-f)x})O_{12},$$

brackets and parentheses denoting octahedral and tetrahedral sites, respectively. The resulting magnetic moment (measured in Bohr magnetons) is $\sigma = 5(1+x(2f-1))$. For example, if $x=1$ in the film, that is, if each formula unit contains one nonmagnetic ion substituting for an iron ion and if $f=1$ in a particular region, that is, if all nonmagnetic ions are on octahedral sites, then $\sigma = 10$ in this region. If in another region $f=0$, that is, if all nonmagnetic ions are on tetrahedral sites, then $\sigma = 0$ in this second region. Clearly, by adjusting the value of the parameter $f$ between 0 and 1 any value of $\sigma$ between 0 and 10 can be produced. Different ranges for $\sigma$ can be obtained by changing the value of the parameter $x$.

SUMMARY OF THE INVENTION

The device is based on the interaction of light traveling in the plane of a thin film with magnetic patterns in the film. The film incorporates patterned regions whose coercivity is significantly different from that of the area surrounding the regions. Electromagnetic radiation injected into the device interacts with the regions in such a way that it emerges in one of at least two directions, depending on the magnetic state of the regions. Regions suitable for this purpose are (1) a grating pattern, and (2) a waveguiding strip, the shape of such regions being chosen to assure adequate intensity and separation of the outgoing beams.

DETAILED DESCRIPTION

1. The Figures

Figure 1:
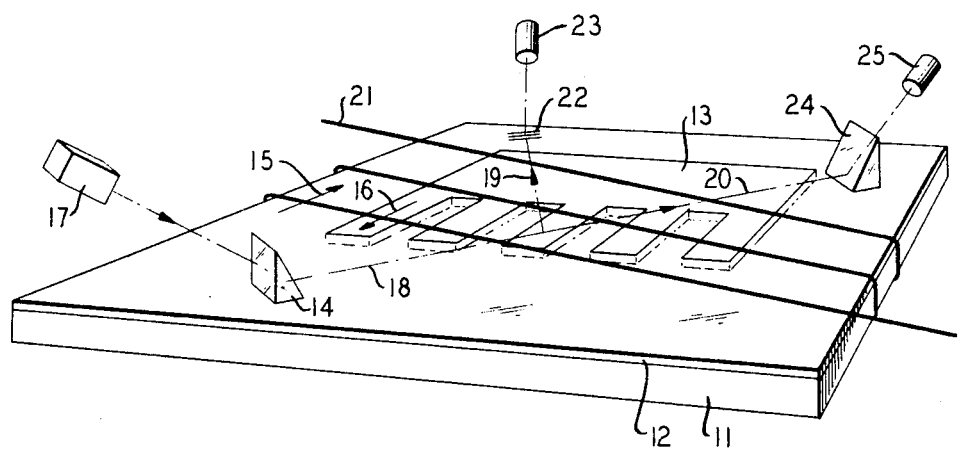
FIG. 1 is a magnified perspective view of an embodiment of the device using a region which acts as a diffraction grating.
Figure 2:
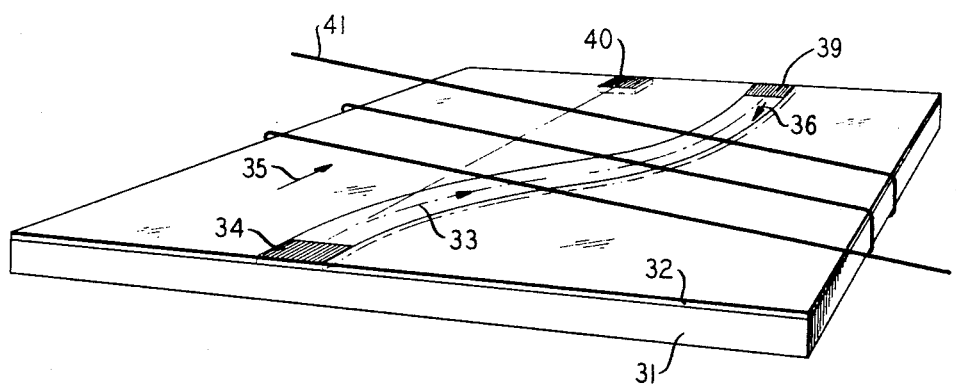
FIG. 2 is a magnified perspective view of an alternate embodiment of the device using a curved strip which acts as a waveguide.

FIGS. 1 and 2 show two possible embodiments of the invention using light deflecting regions of different shapes. FIG. 1 also shows a light source external to the film, means for coupling light into and out of the film, and means for detecting the outgoing radiation. FIG. 2 shows an embodiment of the device equipped with a laser light source and light detectors as integral parts of the film. Both figures show a circuit for creating a magnetic field to switch the magnetization of the regions.

FIG. 1 shows a magnetic film 12 deposited on a substrate 11. Film 12 is magnetized in direction 15 except for region 13 which is magnetized in direction 16 opposite to direction 15. The device is equipped with a prism 14 for coupling light emanating from light source 17 into the plane of the film. Incoming beam 18 is deflected by region 13 and travels on in direction 19. Grating coupler 22 deflects beam 19 out of the plane of the film and into photomultiplier 23. By means of a magnetic pulse (induced, for instance, by a current flowing in winding 21) it is possible to reverse the direction 16 of magnetization in region 13 rendering the film optically homogeneous. Region 13 now is ineffective as a light deflector and incoming light 18 travels on in direction 20. Prism coupler 24 deflects beam 20 out of the plane of the film and into photomultiplier 25. By means of an opposite magnetic pulse (induced, for instance, by an opposite current in winding 21) the original magnetization pattern can be restored to switch the outgoing beam back into photomultiplier 23.

FIG. 2 shows magnetic film 32 deposited on a substrate 31. Film 32 is magnetized in direction 35 except for strip 33 which is magnetized in direction 36 opposite to direction 35. Strip 33 having in this state of magnetization a refractive index greater than that of the surrounding area, light emanating from light source 34 is guided along strip 33 into light detector 39. If the magnetization of strip 33 is reversed by means of a magnetic pulse induced by a current flowing in winding 41, the film becomes optically homogeneous. Hence, in this state of magnetization of strip 33, light emanating from light source 34 travels in a straight line into light detector 40. By means of an opposite magnetic pulse, the original magnetization pattern can be restored to switch the outgoing beam back into light detector 39.

2. The Mechanism

The device uses a thin film of a magnetic material which is transparent to electromagnetic radiation traveling in the plane of the film and in which regions can be influenced by means of an externally applied magnetic field. Of practical interest are radiation whose wavelength is not greater than about 10 microns, and films whose thickness is within range of from one-half to two times the wavelength of the radiation used. Eminent among materials suitable for the purpose of the invention are magnetic garnet films deposited on a nonmagnetic garnet substrate whose refractive index is smaller than that of the film.

By means of a magnetic field the regions can be switched between at least two magnetic states, of which at least one is characterized by the regions being magnetically saturated and their magnetization having a sizeable component in the direction of the incoming beam. For the sake of a strong effect, the magnetization of the regions in at least one state should desirably have a component of not less than ten percent in the direction of light propagation. Furthermore, in order to prevent undue energy loss due to scattering, it is desirable that the area surrounding the region as well as the region in its other states be magnetically saturated also.

Magnetic saturation may be achieved by means of a bias field; alternatively, the film may be made of a material which, due to inherent remanence, stays magnetized without a bias field. Incoming radiation travels in the regions with a velocity depending on the magnetization of the region; specifically, each mode of radiation encounters a change of refractive index as it enters the magnetized region. Thus, depending on the shape of the region and the mode of radiation, the incoming beam changes direction. If for one magnetic state the refractive index of the region is the same as that of the surrounding area, the direction of light propagated in the film is not influenced by the regions. This is the situation depicted in the figures. However, other embodiments of the invention may cause light to be deflected by different amounts for the different magnetic states of the regions.

A specific example of a thin film suitable for the claimed device is a garnet film near the compensation point, that is, a film which contains nonmagnetic ions distributed over sites such that the moment $M_O$ due to the octahedral ions is balanced by the moment $M_T$ due to the tetrahedral ions. For the sake of a strong interaction between the light and the magnetization, the easy direction of magnetization should lie in the plane of the film. This may be accomplished by exploiting magnetostriction between the film and a substrate with slightly mismatched lattice constant. If a region has been created in the film (such as the grating of FIG. 1, or the strip of FIG. 2) in which nonmagnetic ions predominate in tetrahedral sites, possible values for the magnetizations $M_O'$ and $M_T'$ in the region due to octahedral and tetrahedral ions, respectively, are $M_O' = 4100G$ and $M_T' = 3900G$. Hence the net moment in the region is $M_S' = M_O' - M_T' = 200G$, whereas in the surrounding area $M_O = 4010G$, $M_T = 3990G$, and $M_S = M_O - M_T = 20G$. This film is transparent to near infrared light such as generated by a helium neon laser (wavelength 1.15 microns). Since light interacts primarily with the octahedral sublattice and since $M_O$ is nearly equal to $M_O'$ in magnitude, light travels virtually undisturbed when $M_O$ is parallel $M_O'$. However, when $M_O'$ is antiparallel to $M_O$, light propagating in a direction with a sizeable component in the direction of $M_O'$ encounters a change in refractive index and is deflected by the region. Switching the magnetic state of the region is accomplished by means of a magnetic field, the coercive force $H_c'$ being ten times as small inside as outside the region.

While in the embodiment described above the magnetic moments inside and outside the regions differ by a factor of ten, the device can be implemented with a much smaller difference. Specifically, since magnetic fields can be controlled accurately, a difference of 1 percent between the two coercive forces suffices to selectively switch the magnetic state of the regions.

Due to its bulk, the helium-neon laser light source mentioned above is not suitable for truly integrated systems. A miniature laser suitable for integration into the film is the Neodymium-YAG laser; however, the device is not tied to any particular light source. Moreover, embodiments using the waveguiding strip do not require monochromatic, let alone coherent, radiation. Also, polarization of the beam is not required. Hence it is possible to use compact light sources such as light emitting diodes integral to the film as well as film lasers.

What is claimed is:

1. Device comprising a thin magnetic film transparent to electromagnetic radiation propagating in the plane of the film, means for inserting electromagnetic radiation into the film, means for extracting energy corresponding to radiation traveling in the plane of the film, means for magnetically biasing the film characterized in that said device has a pattern defined by a region of a composition different from the composition of the area surrounding the region and whose coercivity is different from that of the area surrounding said regions, said difference in coercivity being due to said different composition and allowing said regions to be switched selectively by means of an external magnetic field between at least two magnetic states, in at least one of said states the regions being magnetically saturated and in at least one of said states their magnetization having a component in the direction of propagation of said electromagnetic radiation, said electromagnetic radiation being caused to follow a path which differs in accordance with said magnetic state of said regions.

2. Device of claim 1 in which said patterned regions are magnetically saturated in said two states.

3. Device of claim 1 in which said patterned regions in one of said magnetic states have essentially the same refractive index as the area surrounding said regions so that said propagating electromagnetic radiation is substantially unaffected by said patterned regions.

4. Device of claim 1 in which the magnetization of said regions in at least one of said magnetic states has a component of at least 10 percent in the direction of light propagation.

5. Device of claim 1, electromagnetic radiation being of wavelength of a maximum of 10 micrometers.

6. Device of claim 1, the film being of a thickness in range of from one-half to two times the wavelength of the electromagnetic radiation.

7. Device of claim 1 in which said difference in coercivity amounts to at least 1 percent.

8. Device of claim 1 in which said magnetic film is a magnetic garnet deposited on a garnet substrate.

9. Device of claim 1 in which at least one of said means is a prism coupler.

10. Device of claim 1 in which at least one of said means is a grating coupler.

11. Device of claim 1 in which said means for inserting electromagnetic radiation is included in the film.

12. Device of claim 11 in which said included means is a laser.

13. Device of claim 11 in which said included means is a light emitting diode.

14. Device of claim 1 in which said means for extracting energy is a light detector integral with film.

15. Device of claim 1 in which said regions form a diffraction grating.

16. Device of claim 1 in which said regions form a waveguiding strip.

17. Device of claim 1 in which said means for switching said magnetic state is an electromagnet.

* * * * *

UNITED STATES PATENT AND TRADEMARK OFFICE
CERTIFICATE OF CORRECTION

PATENT NO. : 3,870,397

DATED : March 11, 1975

INVENTOR(S) : Joseph F. Dillon, Jr., Ernst M. Gyorgy
LeGrand G. Van Uitert

It is certified that error appears in the above-identified patent and that said Letters Patent are hereby corrected as shown below:

At [75] Inventors: on the first page, the information now reading "Joseph Francis Dillon, Jr.; Ernst Michael Gyorgy Madison; Legrand Gerard Van Uitert, all of Morris Township, Morris County. N. J." should read --Joseph Francis Dillon, Jr, Morris Township; Ernst Michael Gyorgy, Madison; LeGrand Gerard Van Uitert, Morris Township; all of Morris County, N. J.--.

Signed and Sealed this twenty-third Day of September 1975

[SEAL]

Attest:

RUTH C. MASON
Attesting Officer

C. MARSHALL DANN
Commissioner of Patents and Trademarks